Feb. 12, 1929.
J. F. SINCOCK ET AL
1,701,826
DITCHING MACHINE
Filed April 21, 1927
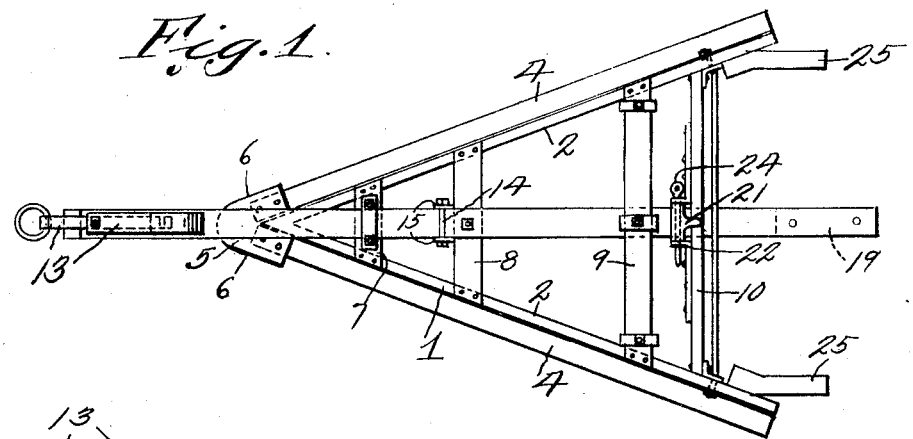
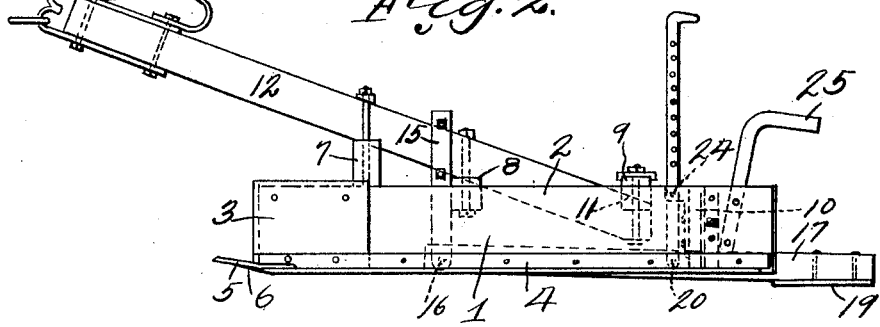
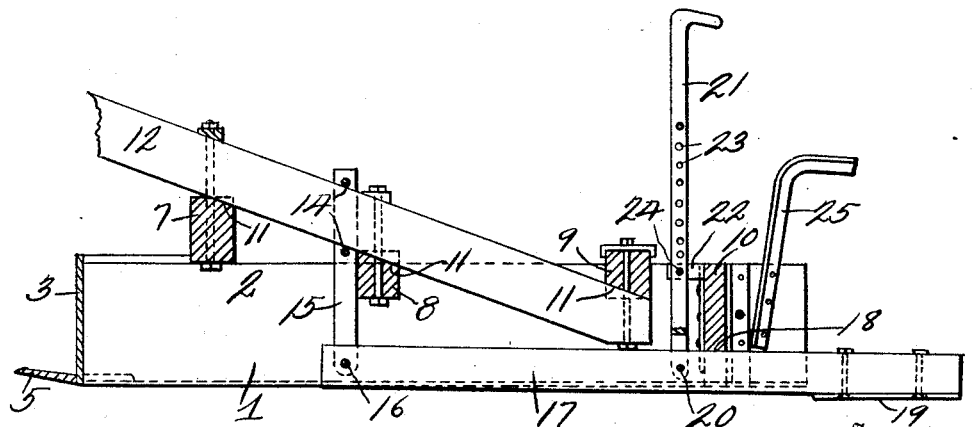

Patented Feb. 12, 1929.

1,701,826

UNITED STATES PATENT OFFICE.

JOHN F. SINCOCK AND WILLIAM F. BOGENHAGEN, OF SEDGWICK, COLORADO.

DITCHING MACHINE.

Application filed April 21, 1927. Serial No. 185,421.

The invention relates to ditching machines particularly adapted for cleaning old irrigation laterals and has for its object to provide a device of this character which is V-shaped, the lower edges of which are provided with outwardly extending cutting blades and an upwardly and forwardly inclined draft bar to which animals may be hitched.

A further object is to provide the rear ends of the diverging sides of the V-shaped member with upwardly extending handle members adapted to be grasped by the operator for controlling the device as it moves through a lateral.

A further object is to provide the draft means with downwardly extending arms terminating adjacent the lower end or side of the device, and between which is pivotally mounted a rearwardly extending bar, the rear end of which extends through a recess in the transversely disposed brace, and has pivotally connected thereto an upwardly extending apertured bar extending through an apertured plate, and forming means whereby said pivoted bar may be adjusted downwardly in relation to the underside of the V-shaped member for varying the angle of the V-shaped member and the projecting blade at the forward end thereof, thereby regulating the depth of cut of the device.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a top plan view of the device.

Figure 2 is a side elevation of the ditching machine.

Figure 3 is a vertical longitudinal sectional view through the ditching machine.

Referring to the drawing the numeral 1 designates the V-shaped body of the ditching machine, which body is formed from diverging side members 2, which may be formed from any kind of material and from a reinforcing plate 3, which houses the forward end of the body and forms a cutting edge. Secured to the lower outer sides of the members 2 are outwardly extending cutter blades 4, which blades cut roots, weeds and dislodge the dirt in the bottom of a lateral of an irrigation ditch where the device is particularly adapted for use. The forward end of the body 1 is provided with a forwardly extending sharpened point 5, the sharpened edges 6 of which merge into the edges of the blades 4, thereby insuring a positive cutting and shearing action as the device moves forwardly through a ditch.

Extending transversely of the device and connecting the members 2 are braces 7, 8, 9 and 10, and anchored in recesses 11 of the braces 7, 8 and 9 is an upwardly and forwardly extending draft bar 12, the forward end of which is provided with means 13, to which draft animals may be attached for dragging the device through a ditch or lateral. Clamped to opposite sides of the draft bar 12 by means of bolts 14 are downwardly extending plates 15, which plates are additionally braced by engagement with the forward side of the bar 8. The plates 15 terminate adjacent the lower side of the body and have pivotally mounted therebetween at 16 a rearwardly extending bar 17, which bar extends through the recess 18 in the underside of the brace bar 10 and is adapted to be adjusted downwardly for sliding over the bottom of the ditch and preventing lateral swinging of the V-shaped member 1 during its cutting and shearing action, thereby insuring a positive operation. Pivoted member 17 imbeds itself in the bottom of the ditch for the above purpose. It also forms means whereby the angle of the V-shaped body may be varied in relation to the bottom of the ditch for regulating the depth of cut of the ditcher. The rear under side of the bar 17 is preferably provided with a wear plate 19 when said bar is formed from wood or other material which will easily wear. Pivotally connected at 20 to the bar 17 is an upwardly extending arm 21, which extends through an apertured bracket 22 and is provided with a plurality of apertures 23 adapted to receive a securing pin 24, and which securing pin extends through registering apertures of the bracket 22 and the arm 21. It will be seen that by adjusting the arm 21 in relation to the apertured bracket 22, the pivoted bar 17 may be held at various angular positions in a vertical longitudinal plane, and the angular adjustment may be easily and quickly accomplished. Extending upwardly from the rear ends of the members 2 are handle members 25 adapted to be grasped by the operator for controlling the device as it moves through a ditch.

From the above it will be seen that a ditcher is provided which is particularly adapted for cleaning old irrigation laterals and side swing is prevented and a ditch can be easily ployed in and smoothed up.

It will also be seen that the device is simple in construction, the parts reduced to a minimum, and one which may be cheaply manufactured and sold.

The invention having been set forth what is claimed as new and useful is:—

The combination with a V-shaped ditching machine having a forwardly and upwardly extending draft bar, a transversely disposed brace bar beneath said draft bar, of downwardly extending brackets carried by the draft bar in engagement with opposite sides thereof and engaging the forward side of the brace bar, bolts extending through the brackets and engaging the upper and lower sides of the draft bar, a pivoted bar pivoted to the bracket, said pivoted bar extending rearwardly and means cooperating with said pivoted bar whereby said pivoted bar may be adjusted downwardly to various angles in relation to the ditcher.

In testimony whereof we hereunto affix our signatures.

JOHN F. SINCOCK.
WILLIAM F. BOGENHAGEN.